United States Patent
Hinsberger

(10) Patent No.: US 10,801,616 B2
(45) Date of Patent: Oct. 13, 2020

(54) HYDROSTATIC DRIVE

(71) Applicant: HYDAC Systems & Services GmbH, Sulzbach/Saar (DE)

(72) Inventor: Kenny Hinsberger, Quierschied (DE)

(73) Assignee: HYDAC SYSTEMS & SERVICES GMBH, Sulzbach/Saar (DE)

( * ) Notice: Subject to any disclaimer, the term of this patent is extended or adjusted under 35 U.S.C. 154(b) by 203 days.

(21) Appl. No.: 15/574,175

(22) PCT Filed: May 6, 2016

(86) PCT No.: PCT/EP2016/000743
§ 371 (c)(1),
(2) Date: Nov. 15, 2017

(87) PCT Pub. No.: WO2016/184546
PCT Pub. Date: Nov. 24, 2016

(65) Prior Publication Data
US 2018/0128369 A1    May 10, 2018

(30) Foreign Application Priority Data

May 16, 2015   (DE) .................. 10 2015 006 321

(51) Int. Cl.
*F16H 61/4096* (2010.01)
*F16H 61/4035* (2010.01)
(Continued)

(52) U.S. Cl.
CPC ..... *F16H 61/4096* (2013.01); *F16H 61/4008* (2013.01); *F16H 61/4017* (2013.01); *F16H 61/4026* (2013.01); *F16H 61/4035* (2013.01)

(58) Field of Classification Search
CPC ............ F16H 61/4096; F16H 61/4008; F16H 61/4026; F16H 61/4017; F16H 61/4035;
(Continued)

(56) References Cited

U.S. PATENT DOCUMENTS 4,215,545 A * 8/1980 Morello .................... B60K 6/12
60/413
6,681,571 B2 * 1/2004 Bailey ..................... F04B 49/03
60/429

(Continued)

FOREIGN PATENT DOCUMENTS

DE       100 00 110        7/2001
DE   10 2007 012 121       9/2007
(Continued)

OTHER PUBLICATIONS

International Search Report (ISR) dated Aug. 23, 2016 in International (PCT) Application No. PCT/EP2016/000743.

*Primary Examiner* — Dustin T Nguyen
(74) *Attorney, Agent, or Firm* — Wenderoth, Lind & Ponack, L.L.P.

(57) ABSTRACT

A hydrostatic drive, as a whole system, includes two fluidic displacement units (1, 3), which can be adjusted at least in respect of the volumetric flow. One unit is coupled to an input (9). The other unit is coupled to an output (11). The units can be connected to each other in the manner of a closed fluidic circuit, to which a storage circuit (23) is connected. The storage circuit has at least one storage device (33), is divided into a low-pressure side (27) and a high-pressure side (25), and has a valve control (17) for controlling the whole system.

25 Claims, 6 Drawing Sheets

(51) Int. Cl.
  *F16H 61/4008* (2010.01)
  *F16H 61/4017* (2010.01)
  *F16H 61/4026* (2010.01)

(58) Field of Classification Search
  CPC ....... F16H 61/40; F16H 61/4078; B60K 6/12; F15B 2201/31; F15B 2211/625; F15B 2211/20546; F15B 2211/20561; F15B 2211/20569; F15B 2211/7058; F15B 21/14
  USPC .................................................. 60/416, 413
  See application file for complete search history.

(56) References Cited

U.S. PATENT DOCUMENTS

| | | | | |
|---|---|---|---|---|
| 8,959,905 | B2* | 2/2015 | Baltes | B60K 6/12 60/414 |
| 9,180,764 | B2* | 11/2015 | Bauer | B60K 6/12 |
| 10,215,199 | B2* | 2/2019 | Cosoli | F16H 61/4096 |
| 10,215,276 | B2* | 2/2019 | Serrao | B60K 6/12 |
| 10,220,697 | B2* | 3/2019 | Dousy | F16H 61/4096 |
| 2001/0025488 | A1 | 10/2001 | Wustefeld et al. | |
| 2004/0103656 | A1* | 6/2004 | Frazer | F15B 1/024 60/414 |
| 2011/0314801 | A1 | 12/2011 | Baltes et al. | |
| 2012/0304631 | A1* | 12/2012 | Nelson | F16H 61/4096 60/327 |
| 2012/0308404 | A1 | 12/2012 | Bauer et al. | |
| 2013/0098020 | A1* | 4/2013 | Opdenbosch | E02F 9/2292 60/327 |
| 2015/0204356 | A1* | 7/2015 | Krittian | B60K 6/12 60/414 |
| 2016/0032945 | A1* | 2/2016 | Cho | F15B 13/027 60/413 |
| 2016/0040690 | A1* | 2/2016 | Yudate | E02F 9/2285 60/327 |
| 2016/0265559 | A1* | 9/2016 | Peterson | F15B 7/006 |
| 2018/0170385 | A1* | 6/2018 | Ornella | B60K 6/12 |

FOREIGN PATENT DOCUMENTS

| | | |
|---|---|---|
| DE | 10 2008 057 897 | 5/2009 |
| DE | 10 2009 028 005 | 1/2011 |
| DE | 10 2010 012 975 | 9/2011 |

* cited by examiner

HYDROSTATIC DRIVE

FIELD OF THE INVENTION

The invention relates to a hydrostatic drive as an overall system, comprising two fluidic displacement units, which can be adjusted at least in respect of the volumetric flow. One fluidic displacement unit is coupled to a power unit. The other fluidic displacement unit is coupled to an output drive. The two fluidic displacement units can be connected to each other in the manner of a closed fluidic circuit.

BACKGROUND OF THE INVENTION

Drives of this kind (DE 10 2009 058 005 A1) are known per se and are commonly used as traction drives in commercial vehicles. In an application of this kind, commonly one of the displacement units is driven directly by a combustion engine, and the other displacement unit at the output drive side is coupled with the respective drivetrain.

SUMMARY OF THE INVENTION

Based upon the above-described prior art, an object of the invention to provide an improved hydrostatic drive that is characterized by a particularly cost-effective and energy-efficient operating performance.

This object basically is met in a hydrostatic drive of the kind described at the outset in that an accumulator circuit is provided to which a fluidic circuit is attached that connects the displacement units. The accumulator circuit is provided with at least one accumulator unit. The accumulator circuit is subdivided into a low-pressure and a high-pressure side. A valve control device or valve control is provided to control the overall system. With a system design of this kind, over and above the pure drive function and brake energy recovery, but further special functions such as overspeed protection during brake energy recovery in overrun mode or hydraulic boosting of the drive performance can be realized.

Advantageously, when the fluidic circuit is closed, both displacement units are connected to each other on their respective input and output side each with a load line. The valve control device is disposed essentially between the two load lines.

In this instance the valve control device may be provided with two first valve devices which, in their open position, connect the two displacement units via the respective load line, and which in their shut-off position disconnect at least the high-pressure side from the low-pressure side of the overall system. The displacement unit of the output drive side is assigned to the low-pressure side, and the displacement unit of the power unit side is assigned to the high-pressure side of the overall system.

In particularly advantageous exemplary embodiments, a second valve device each, with non-return function, is placed in the circuit between the two load lines and the low-pressure side accumulator circuit. As a result of the non-return function of this valve device, the pressure medium, which is at minimum pressure, is able to spread through the overall system, and thus, ensures a close to constant low pressure level in the overall system, even with the traction drive in operation.

In a particularly advantageous manner, a further third valve device with proportional function can be placed between the two load lines and the high-pressure side accumulator circuit. This arrangement provides the possibility of a proportional adjustment of the desired working pressure in the respective load line, and serves as non-return valve to charge the accumulator device when not in operation and for Start-Stop operation.

In particularly advantageous exemplary embodiments, a permanent fluid supply is connected to the low-pressure accumulator circuit between the second valve devices and the output drive side displacement unit. A constant pressure supply of this kind ensures that the low-pressure side is retained at the system-specific charging pressure level. The overall system is also filled via this supply line. Any volume losses that may occur are also replenished, for example, if due to pressure spikes fluid is released via a pressure relief valve and flows back to the tank or if losses occur due to leakage.

A particularly advantageous arrangement may be that the permanent fluid volume supply is connected to a feed line at its inlet that vents into a tank at the outlet side. The feed line is permanently connected to the low-pressure accumulator circuit via a connection point. A non-return valve is disposed into the feed line between the connection point and the inlet. A pressure relief valve is disposed in that feed line between the connection point and the outlet.

Moreover, in an advantageous manner two further, fourth valve devices with proportional pressure relief function may be disposed between the two load lines, in the line section between the two first valve devices as well as the two third valve devices, extending parallel to the third valve devices.

Between the pairs of third and fourth valve devices with their associated connecting lines, a further connecting line may advantageously be placed, into which a further non-return valve is inserted.

In a particularly advantageous manner, the accumulator device of the accumulator circuit may essentially be a double-piston accumulator. The double-piston of the accumulator is guided longitudinally moveable in an accumulator housing and separates a first working chamber applied with a charging pressure from a second working chamber on the high-pressure side, as well as from a third working chamber on the low-pressure side and a fourth working chamber at atmospheric pressure, from each other. When used for traction drives of mobile units, which usually provide a limited amount of installation space for the hydraulic system, the design according to the invention with a double-piston accumulator, which performs the function of two hydraulic accumulators, then ensures a particularly compact design of the system, which is a particularly significant advantage. Moreover, this arrangement results in a low-pressure side with additional compensation accumulator.

The respective displacement unit may advantageously be a four-quadrant system with adjustable pivoting angle, which may be operated as a hydraulic motor as well as a hydraulic pump.

Another object of the invention is also to provide an improved valve control device as a subsystem, in particular for an overall system in form of a hydrostatic drive.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure.

DETAILED DESCRIPTION OF THE INVENTION

Figure 1:
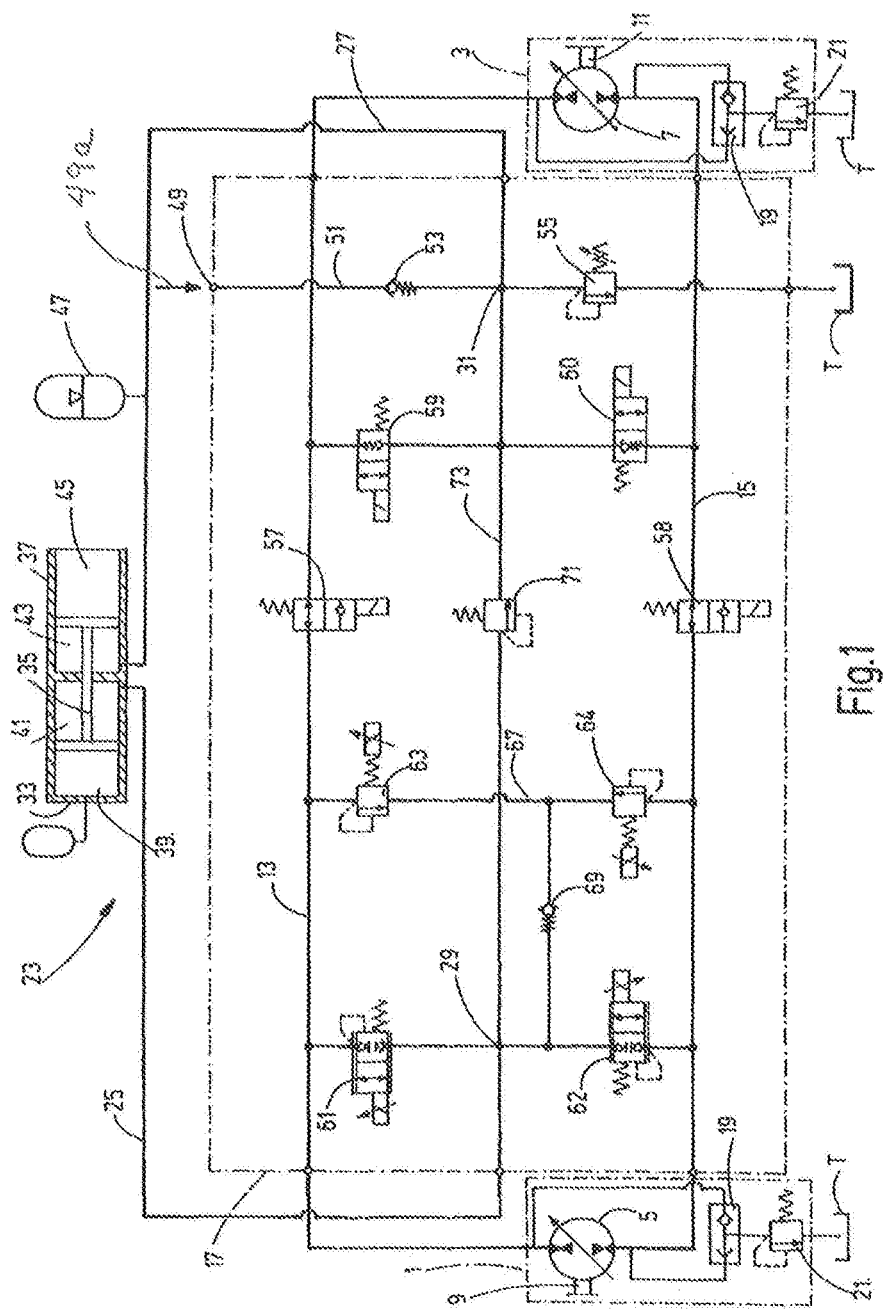
FIG. 1 is a system diagram of the overall system of a hydrostatic drive according to an exemplary embodiment of the invention, designed as a traction drive.

The diagram in FIG. 1 depicts on the power unit side a power displacement unit 1 and on the output drive side an output displacement unit 3. Each displacement unit 1 and 3 comprises a pump motor unit 5 and 7, respectively, in form a of a four-quadrant system with adjustable pivoting angle. On the power displacement unit 1 on the power unit side, the pump motor unit 5 is coupled via a drive shaft 9 with a combustion engine or an electric motor (not shown). At the displacement unit 3 on the output drive side, the pump motor unit 7 is coupled via an output shaft 11 to the drive train (gearbox) of a vehicle (not shown). One connection of the displacement units 1 and 3 is connected to a first load line 13. The other connection of each of the displacement units 1, 3 is connected to a second load line 15. A valve control device or valve control 17 is assigned to the load lines 13 and 15. The two connections of the pump motor units 5 and 7 of the displacement units 1 and 3 are each connected to one of the input ports of a shuttle valve 19. The output port of each shuttle valve 19 is connected via a pressure relief valve 21 to tank T. Thus, the connections of the pump motor units 5 and 7, which carry the higher pressure level, and with them the connected load lines 13 and 15, are protected via the respective pressure relief valve 21 towards the tank against system overpressure.

An accumulator circuit 23 with a high-pressure side 25 and a low-pressure side 27 is assigned to the valve control device 17. The high-pressure side 25 is connected to the valve control device 17 at a connection point 29. The low-pressure side 27 is connected to the valve control device 17 at a connection point 31. The accumulator device of the accumulator circuit 23 is a hydro-pneumatic double-piston accumulator 33. Its double-piston 35 is guided longitudinally moveably in accumulator housing 37 and separates in accumulator housing 37 a first working chamber 39 that contains a process gas, in particular $N_2$, under charging pressure, from a second working chamber 41 connected to the low-pressure side 27 of the accumulator circuit 23, from a third working chamber 43 connected to the low-pressure side 27 of the accumulator circuit 23, and from a fourth working chamber 45 at atmospheric pressure. A pneumatically charged hydraulic accumulator 47, which is connected additionally on the low-pressure side 27, serves as volume compensator in the instance of unsteady events or due to temperature fluctuations. Moreover, a permanent fluid volume supply (graphically shown by arrow 49a) is connected at a feed-in point 49. The permanent fluid volume supply is connected via a feed-in line 51 and via a non-return valve 53 to the connection point 31, and then to the low-pressure side 27 of the accumulator circuit 23. The feed-in line 51 leads from the connection point 31 via a pressure relief valve 55 to tank T. This constant pressure supply ensures that the low-pressure side 27 is maintained at the system-specific charging pressure level and that the overall system is filled via the feed-in line 51 if volume losses need to be replenished, for example, if in the instance of pressure spikes fluid flows via the pressure relief valve 21 and/or 55 to tank T.

The valve control device 17 provides in the load lines 13, 15 a pair of first valve devices, each of which is a 2/2-way valve 57 and 58, respectively, each with a non-return function. In their open position valves 57, 58 connect the two pump motor units 5 and 7 together. In the closed position valves 57, 58 uncouple the respective high-pressure side of the overall system from the low-pressure side. Depending on the orientation of the non-return function, the displacement unit 1 is assigned to the high-pressure side, and the displacement unit 3 is assigned to the low-pressure side of the overall system. Disposed between the load lines 13 and 15 and the low-pressure side 27 of the accumulator circuit 23 is a pair of second valve devices or valves, each of which also is a 2/2-way valve 59 and 60, respectively, each with a non-return function. Moreover, disposed between the load lines 13 and 15 and the connection point 29 with the high-pressure side 25 of the accumulator circuit 23 is a pair of third valve devices or valves with proportional and shut-off function, each of which is a 2/2-way valve 61 and 62, respectively.

Disposed in the line section of the load lines 13, 15 between the directional valves 57 and 58, respectively, and the directional valves 61 or 62 respectively, connected in parallel to the valves 61, 62, a pair of further, fourth valve devices or valves, which comprise pressure relief valves 63 and 64, respectively, each with proportional pressure relief function. Disposed between the connection point 29 of the high-pressure side 25 of the accumulator circuit 23 and the connecting line 67 between the pressure reducing valves 63 and 64 is a further non-return valve 69. The overall system is completed by a pressure relief valve 71, located in the connecting line 73 that extends between the connecting points 29 and 31, that is, the connecting points of the accumulator 23.

The following FIGS. 2 to 6 depict the fluid paths for a number of different operating states yet to be described. The fluid paths in connection with the high-pressure side 25 of the accumulator circuit 23 are shown in full lines. The fluid paths in connection with the low-pressure side are shown in broken lines. The flow direction is indicated by arrows.

Figure 2:
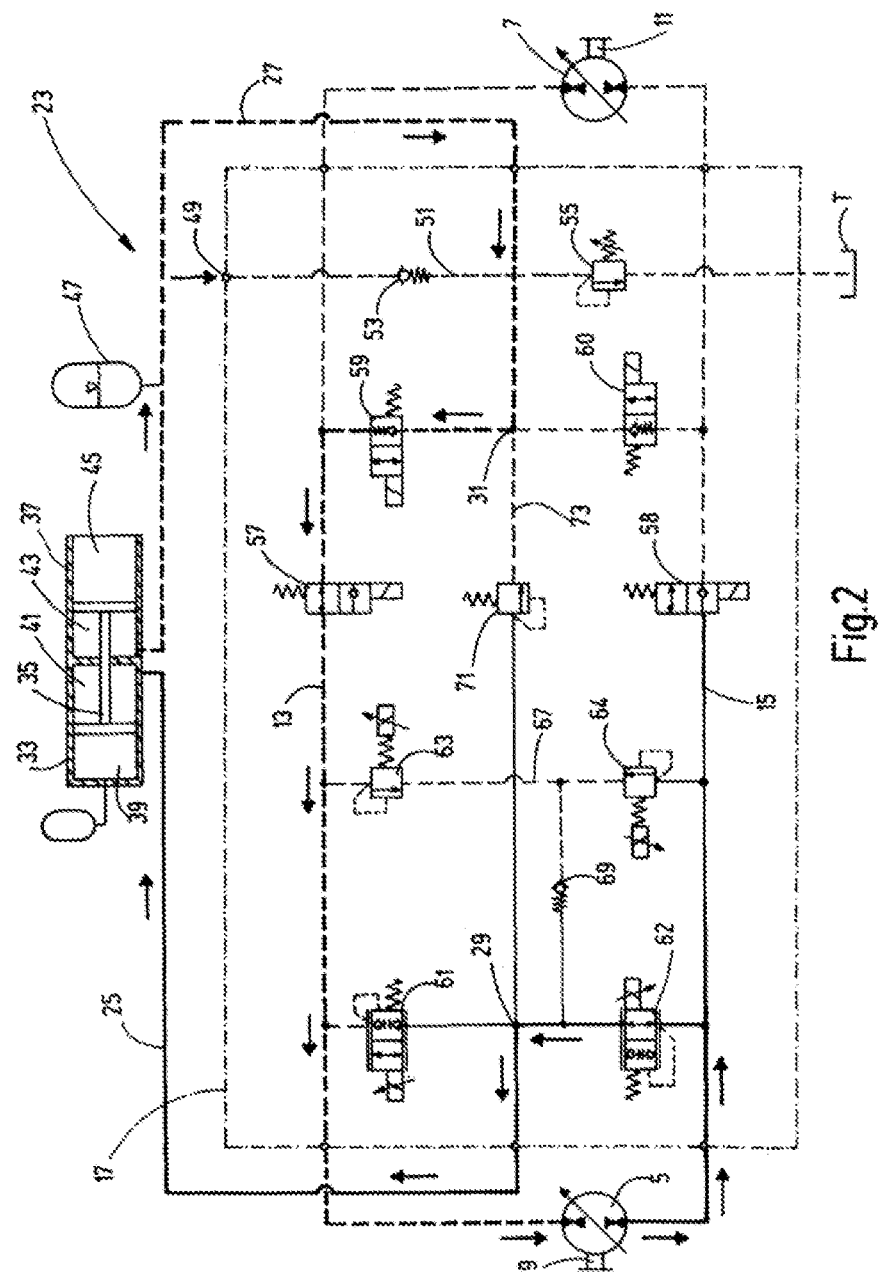
FIG. 2 is a symbolic diagram of the circuit of the exemplary embodiment, wherein for the operating state "Charge Accumulator", when at standstill, high-pressure fluid paths are shown in full lines, low-pressure fluid paths are shown in broken lines and the flow direction is indicated by arrows.

The FIG. 2 depicts the operating state when charging the double-piston accumulator 33 where the traction drive is at standstill. The prerequisite for charging is a running combustion engine, as well as free accumulator volume. If the traction drive is at standstill, the pump motor units 5 and 7 are in neutral position to start with, without displacement, hence no hydraulic fluid flows via these units. To provide a volume flow for the charging process, the pump motor unit 5 is pivoted, and the proportional directional valve 62 is switched with maximum deflection, including valve 58. For the feeding process the pivoted pump motor unit 5 demands volume from the first load line 13, which flows from the third working chamber 43 on the low-pressure side of the double-piston accumulator 33 via the connection point 31 and flows via the non-activated directional valve 59 with open non-return function, as well as the opened directional valve 57, to the pump motor unit 5. The transported volume flows via the fully opened directional valve 62 to the working chamber 41 on the high-pressure side of the double-piston accumulator 33. In this instance, the pressure relief valve 64 is set to at least the charging pressure in the second load line 15 to avoid a volume flow through it. If the maximum accumulator pressure is exceeded, the pressure relief valve 71 is activated and leads the charging volume flow away to the low-pressure side 27. From there it flows via the non-return function of the non-activated directional valve 59 to the first load line 13 and then equalises the volume balance.

Figure 3:
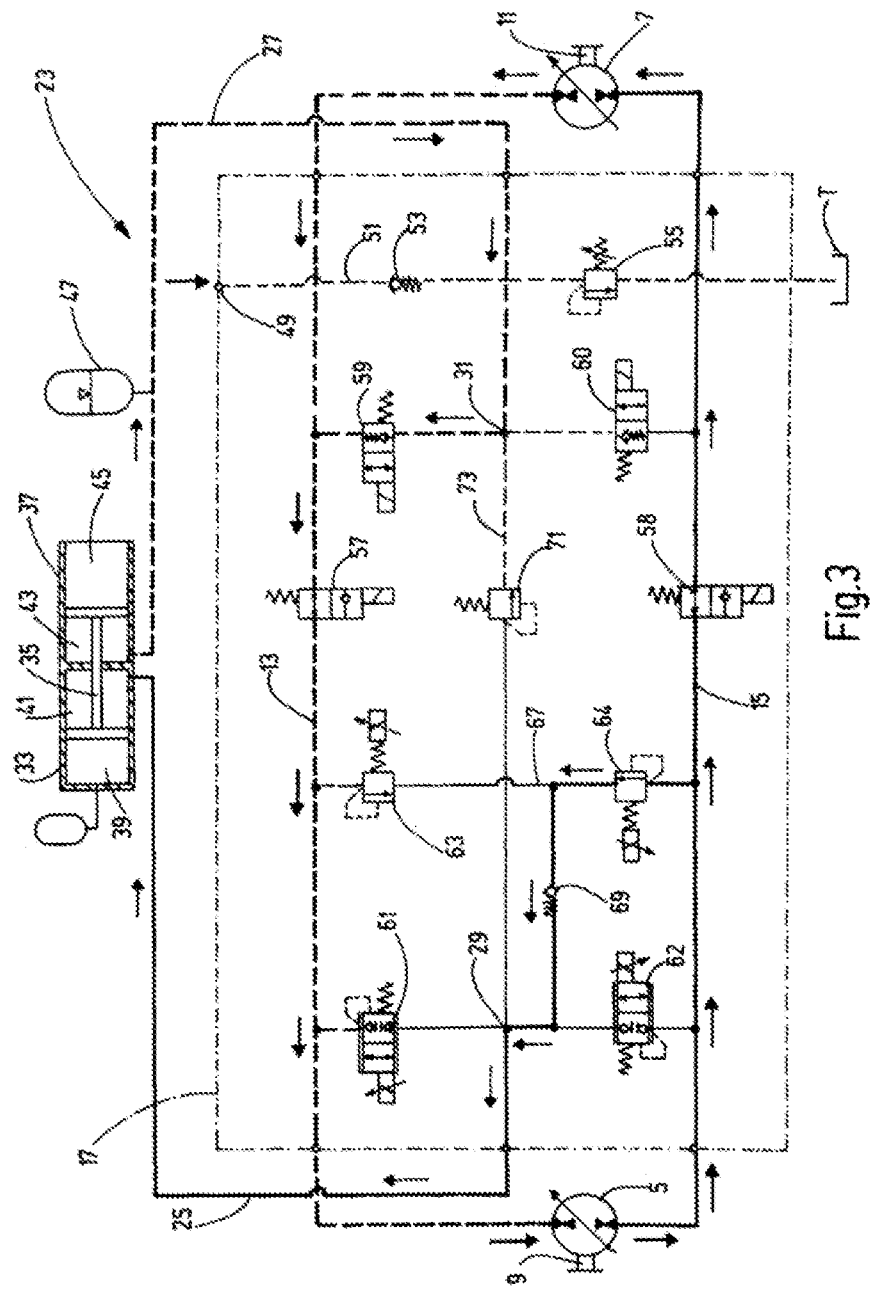
FIG. 3 is a symbolic diagram that corresponds to that of FIG. 2, wherein the operating state "Charge Accumulator" is shown in drive mode.

The FIG. 3 depicts the operating state when charging the double-piston accumulator 33 in drive mode. Again, the prerequisite for charging is a running combustion engine as well as free accumulator volume. In drive mode both displacement units 1 and 3 and the pump motor units 5 and 7 are pivoted and pressure medium circulates between the displacement units 1 and 3. To generate the necessary volume flow for the charging process, the pump motor unit 5 of the displacement unit 1 is pivoted further so that more volume can be fed into the second load line 15 than can be absorbed by the second displacement unit 3. This increases the pressure in the load line 15. As soon as the switch pressure set on the pressure relief valve 64 is reached, volume flows via the downstream non-return valve 69 to the high-pressure side working chamber 41 of the double-piston accumulator 33 and charges it. The volume displaced in the double-piston accumulator 33 on the low-pressure side working chamber 43 flows via the non-return function of the non-activated directional valve 59 to the first load line 13 where it combines with the volume that circulates in drive mode. As soon as the maximum accumulator pressure is exceeded, the pressure relief valve 71 switches and discharges a charging volume flow to the low-pressure side 27, from where it flows via the non-return valve function of the directional valve 59 to the first load line 13 and then equalises the volume balance.

Figure 4:
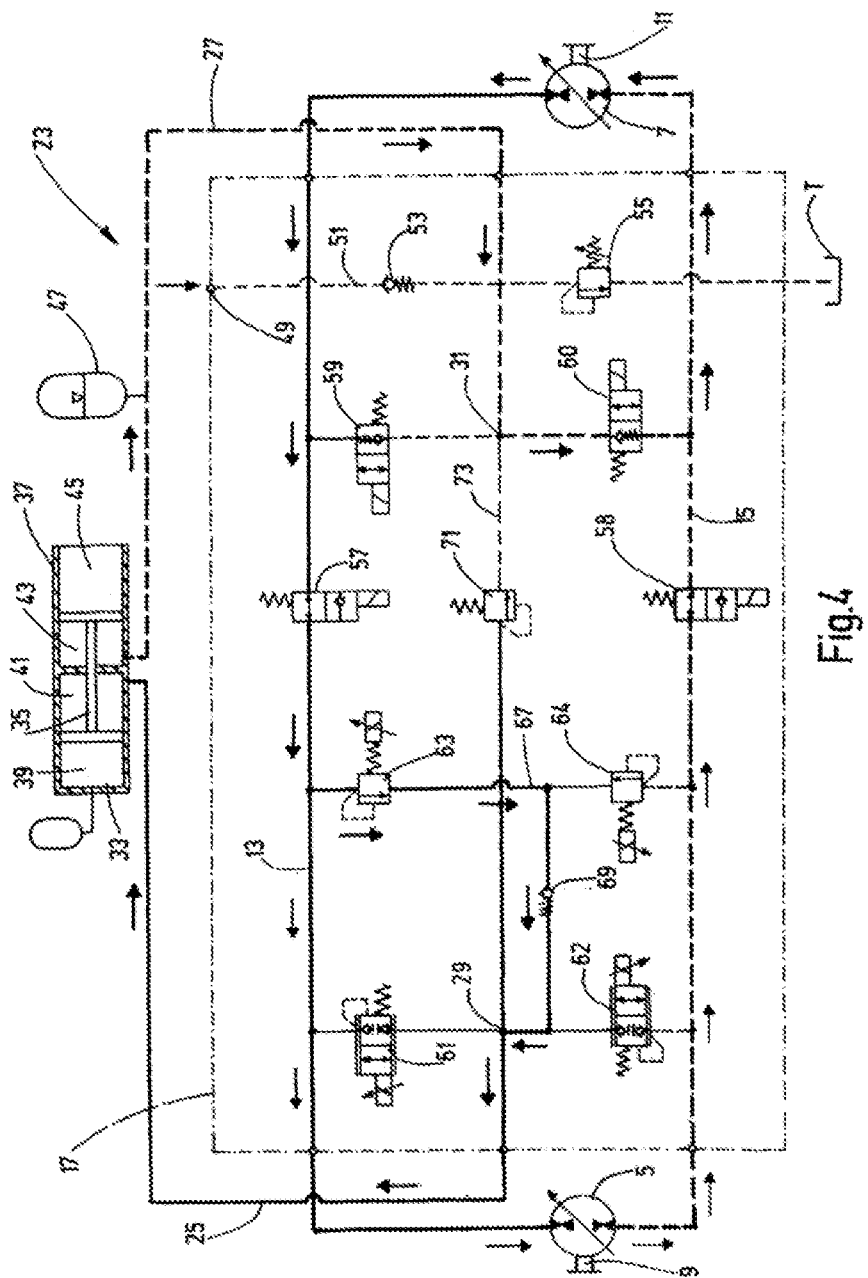
FIG. 4 is a symbolic diagram of the exemplary embodiment that depicts the operating state "Brake Energy Recovery/Overspeed Protection"

The FIG. 4 depicts the operating state "Brake Energy Recovery/Overspeed Protection". The prerequisite for the recovery and accumulation of brake energy is an available accumulator volume in the double-piston accumulator 33 and a vehicle in motion (kinetic energy). The reason why the combustion engine must be protected from overload/overspeed is usually a force that acts on the vehicle, for example, potential energy on a decline. In the instance of a traction drive in motion with the pressure medium in circulation, shown in the diagram of FIG. 4 anti-clockwise or counter-clockwise, the intention is to retard or maintain the driving speed and the engine speed. In drive mode both displacement units 1 and 3 are in operation, wherein the pump motor units 5 and 7 are fully or partially pivoted.

To regenerate brake energy or to provide overload/overspeed protection for the combustion engine, the pump motor unit 5 of the displacement unit 1 is pivoted back so as to reduce the torque that acts on the shaft 9 to such an extent that the load acting on the combustion engine is no longer able to cause any overspeed. As a result the pressure in the first load line 13 rises since the second displacement unit 3 delivers more than the displacement unit 1 can accept. This rising pressure now generates a braking moment in the displacement unit 3, which slows down the vehicle. This slowing may also be referred to as brake energy. In this instance the pressure relief valve 63 is actuated when the set switching pressure is reached, limiting the pressure in the load line 13. The volume discharged via the pressure relief valve 63 flows via the non-return valve 69 to the high-pressure side 25 of the double-piston accumulator 33 and charges it. The volume displaced in the double-piston accumulator 33 flows from the low-pressure side 27 via the directional valve 60 to the load line 15. If the maximum accumulator pressure is exceeded, the pressure relief valve 71 is activated and discharges the charging volume flow towards the low-pressure side 27. To equalise the volume balance, volume is discharged from the low-pressure side 27 via the non-return valve function of the non-activated directional valve 60 to the load line 15. Moreover, the volume displaced from the double-piston accumulator 33 of the low-pressure side 27 flows via the directional valve 60 to the load line 15. The entire volume that comes together in the load line 15 now flows to the suction side of the pump motor unit 7 of the displacement unit 3, thereby ensuring that the volume balance of the system remains constant.

Figure 5:
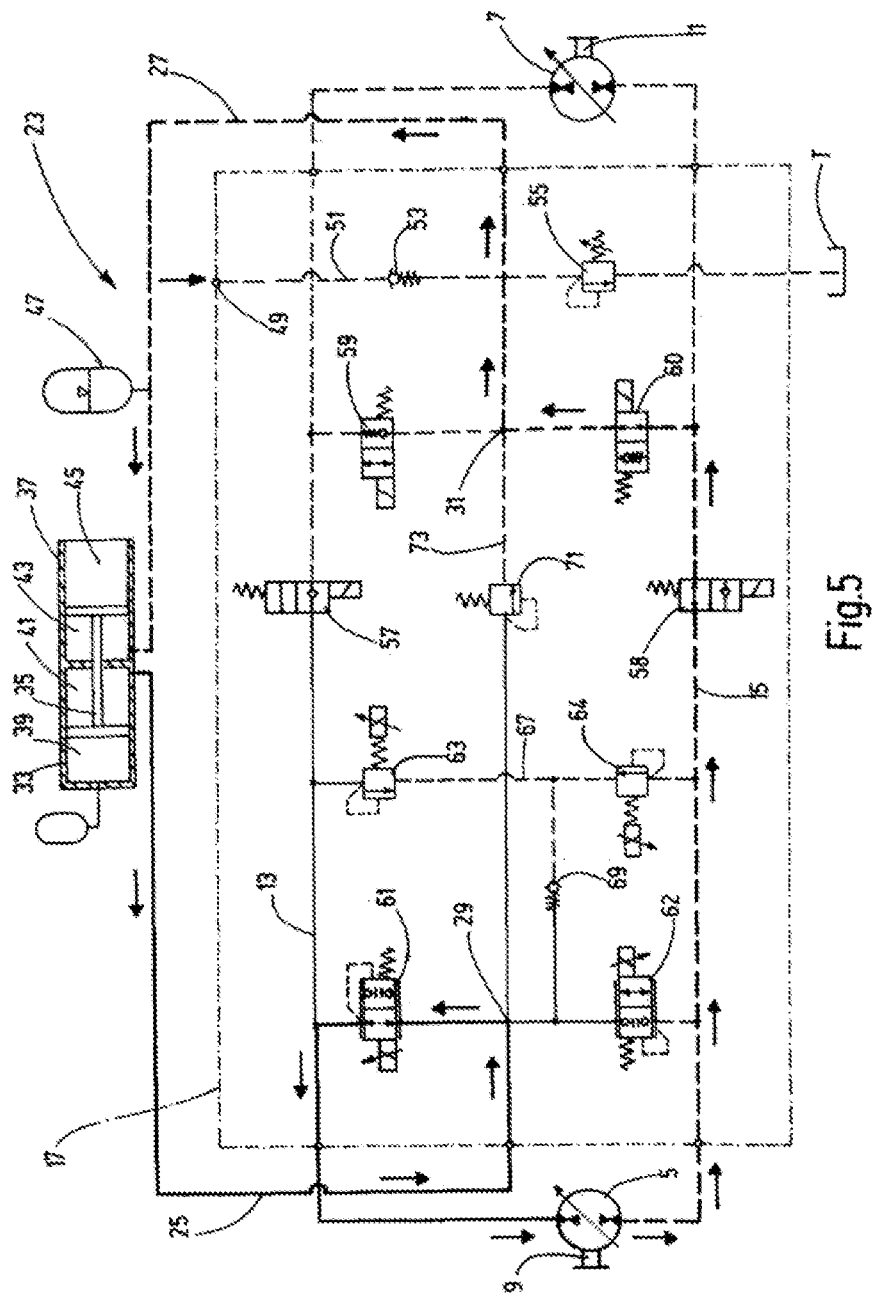
FIG. 5 is a symbolic diagram of the exemplary embodiment that depicts the operating state "Start Combustion Engine"

The FIG. 5 depicts the operating state "Brake Energy Recovery/Overspeed Protection". The prerequisite for the hydraulic starting of the combustion engine is the presence of accumulated energy in the double-piston accumulator 33. In this instance the combustion engine as well as the entire traction drive are shut down, and the pump motor units 5 and 7 of the displacement units 1, 3 are initially in neutral position. On initiating the starting sequence, the pump motor unit 5 of the displacement unit 1 is fully pivoted. The directional valves 61 and 60 are then activated, wherein the directional valve 57 may also be activated so as to avoid pressure spikes on the second displacement unit 3. The pressure medium now flows from the high-pressure side working chamber 41 of the double-piston accumulator 33 via the directional valve 61 to the load line 13 and further to the first displacement unit 1. The pressure relief valve 63 should be set to at least the accumulator pressure in the load line 13 to avoid a volume flowing through it. In the displacement unit 1, hydraulic energy is converted into mechanical energy and generates a starting torque on the shaft 9. The volume flowing via the displacement unit 1 flows towards the load line 15 and via the directional valve 58 and the directional valve 60 to the low-pressure side 27 of the double-piston accumulator 33, where it replaces the volume previously displaced to the high-pressure side 25.

Figure 6:
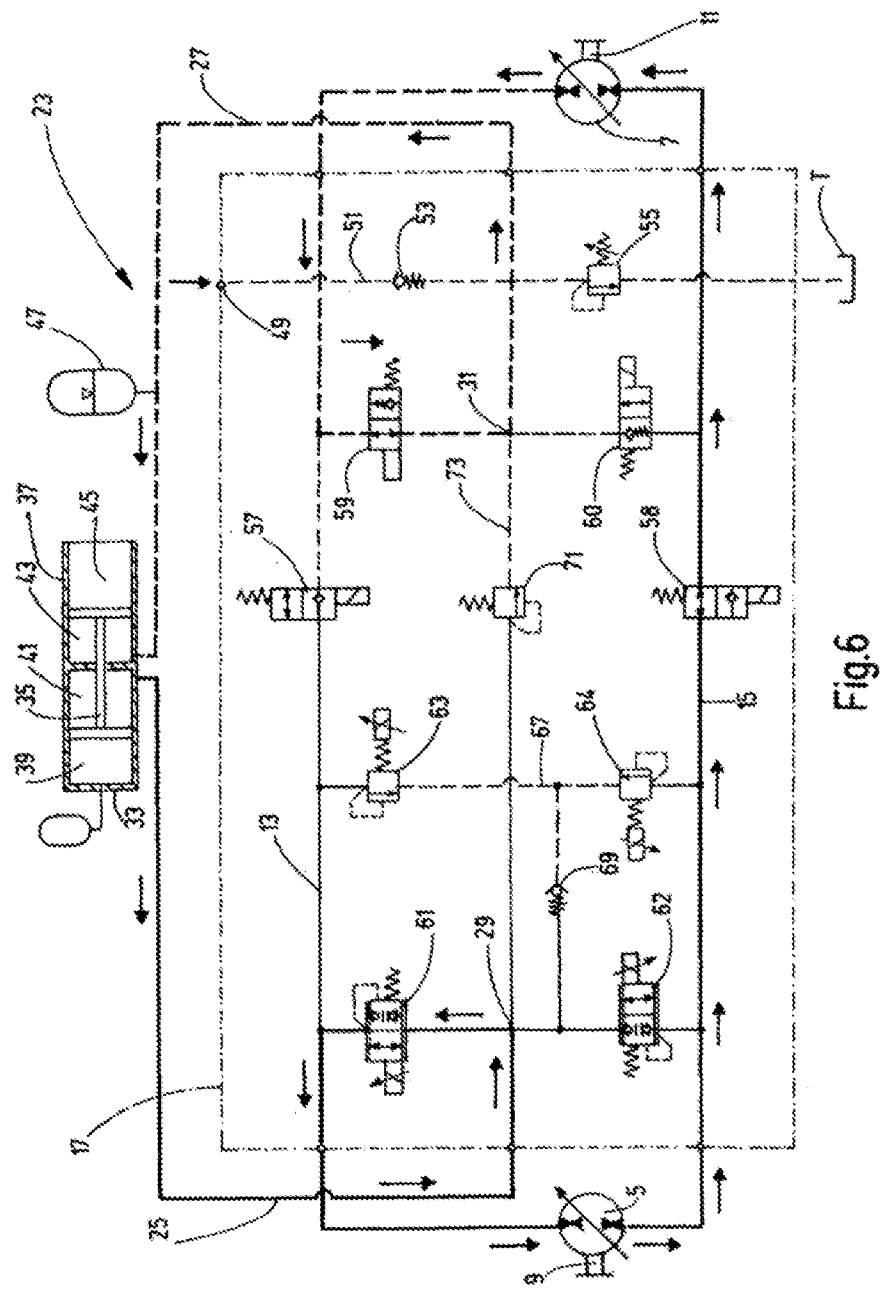
FIG. 6 is a symbolic diagram of the exemplary embodiment that depicts the operating state "Boost".

The FIG. 6 depicts the operating state "Boost". The prerequisite for hydraulically boosting the drive is accumulated hydraulic energy in the hydraulic accumulator. In this instance the traction drive is in motion, and the pressure medium between the displacement units 1 and 3 circulates in anticlockwise or counter-clockwise direction. A sudden load spike on the drive, for example, due to a steep incline, causes a boosting of the drive, while the pump motor units 5 and 7 of both displacement units 1 and 3 are fully or partially pivoted. To facilitate the boosting process, the directional valve 57 is activated first, and then the directional valves 61 and 59 are activated. The advanced activation of directional valve 57 ensures that the pressure medium can only flow in the intended direction via directional valve 57 despite the pressure drop. The directional valve 63 should be set to at least the working pressure present in the load line 13 to avoid a volume flow through it. As a result of activating the directional valves 61 and 59, the pressure medium now flows from the high-pressure side 25 of the double-piston accumulator 33 via the directional valve 61 to the load line 13 and further to the displacement unit 1. This flow raises the pressure level at the suction side of the pump motor unit 5 of the displacement unit 1. To provide the required pressure on the pressure side of the displacement unit 1 (in load line 15), only a small amount of mechanical power is therefore required from the combustion engine, which relieves the load on the combustion engine. The pressure medium flows from the displacement unit 1 via the load line 15 through the directional valve 58 to the second displacement unit 3, where the hydraulic energy is converted into mechanical energy and transmitted to the drive train. In this instance it is necessary that the pressure relief valve 64 is set to the maximum pressure in the load line 15 to avoid a volume flow through it. The pressure medium flows from the first displacement unit 1 via the load line 15 via the displacement unit 7 through the directional valve 59 and on to the low-pressure side 27 of the double-piston accumulator 33, where the volume previously displaced from the high-pressure side 25 is replaced.

The invention permits setting the desired working pressure in the load line 13 proportionally. To this end the proportionally operating directional valve 61 is set to the desired pressure and opens up to a corresponding opening cross-section. The volume balance of the system remains the same in all described processes. Volume is simply shifted from one side of the double-piston accumulator 33 via the accumulator circuit 23 and the displacement units 1, 3 to the other side of accumulator 33, through which energy is emitted or absorbed and accumulated. A closed traction drive system is realised in this manner. A volume flow passes mainly through the non-return valve 53, acting as shut-off valve, during the filling process of the system and caps the constant volume supply from the feed-in point 49 as soon as the low-pressure side 27 of the double-piston accumulator 33 as well as the two load lines 13 and 15 are at the set minimum system pressure. However, no additional volume is required in the instance of a later "reallocation" of the double-piston accumulator 33 volume. Thus, the pressure relief valve 55 remains shut. It serves simply to provide pressure protection to the low-pressure side 27 and can be omitted for the remaining consideration of the function. The same applies for the pressure relief valve 71, which limits the maximum pressure of the high-pressure side 25 of the double-piston accumulator 33.

Load spikes on the combustion engine can not only be generated by the traction drive, but also by the functions of a hydraulic power circuit, the hydraulic pump of which is usually driven by the drive shaft 9 of the displacement unit 1. Nevertheless, even these load spikes that act on the combustion engine can be absorbed through the described boost process. The pair of directional valves 61 and 62 is preferably implemented in the associated valve block as two units that are functionally separated. For each unit a 2/2-way valve, double-sealed, may be provided for connecting the high-pressure side 25 to the load line 13 and to the displacement unit 1 during starting of the combustion engine. A proportional pressure relief valve may be provided to be able to set the pressure of the load lines 13, 15. Moreover, instead of the proportional valve 62, a shut-off valve for charging the accumulator when at standstill may be used.

A combination of both functions proved to be rather problematic since a large cross-section has to be opened up (to achieve a low pressure drop) when starting the combustion engine, and where for the pressure control function a significantly smaller cross-section at high resolution (precision control edge) is required. For different possible designs of the displacement units 1 and 3 (such as constant, variable or mooring pumps) or for varying functions of the drive (e.g., boosting in forward and reverse mode without mooring pumps, or boosting in forward mode only) the functional units of the directional valves 61 and 62 may be provided with only one of the two required functions described. In the instance of relatively large flow rates, providing all functional units of the valve control device 17 as pilot-controlled valves is desirable.

The overall system is symmetrically identical in its structure, and all described functions can also be performed in reverse order. Concerning the definition of the low-pressure and high-pressure side, such definitions depend on the respective operating state and can vary accordingly. The above-described valve devices 57 and 58 may also be viewed as non-return valves as far as their function is concerned. The drive solution according to the invention achieves a largely constant pressure level at the low-pressure side due to the influence of the double-piston accumulator and the additional compensation volume (capacity) of the diaphragm accumulator in the low-pressure side. The constant pressure level also serves as reference pressure for a number of feedforward control circuits in the valve block. A further essential aspect of the invention is the proportionally adjustable and system-size independent pressure control of the suction-side load line in boost mode. Moreover, a proportionally adjustable and system-size independent pressure control of the load line in overrun mode (kinetic and/or potential energy) is achieved.

While one embodiment has been chosen to illustrate the invention, it will be understood by those skilled in the art that various changes and modifications can be made therein without departing from the scope of the invention as defined in the claims.

The invention claimed is:

1. A hydrostatic drive, comprising:
   a first fluid displacement unit having an adjustable volumetric flow and being coupled to a power supply;
   a second fluid displacement unit having an adjustable volumetric flow and being coupled to an output drive, said first displacement unit connected to said second displacement unit in a closed loop circuit by a first and second load lines connected to respective input and output sides of said first and second displacement units;
   an accumulator disposed in an accumulator circuit that is connected to said first and second displacement units, said accumulator circuit being subdivided into a low-pressure side and a high-pressure side;
   a valve system configured to control said first and second displacement units and said accumulator circuit, said valve system being connected to said first and second load lines and including a first control valve positioned in said first load line and a second control valve positioned in said second load line, said first and second control valves connecting said first and second displacement units to one another in two flow directions in their respective open positions thereof and connecting said first and second displacement units to one another in only one flow direction in their respective shut-off positions thereof;
   a first valve with a non-return function being connected to and positioned between said first load line and said low-pressure side of said accumulator circuit; and
   a second valve with a non-return function being connected to and positioned between said second load line and said low-pressure side of said accumulator circuit.

2. A hydrostatic drive according to claim 1, wherein
said second displacement unit is connected to a low-pressure side of the hydrostatic drive; and
said first displacement unit is connected to a high-pressure side of the hydrostatic drive.

3. A hydrostatic drive according to claim 1, wherein
a first proportional valve and a second proportional valve with proportional functions are connected to said first and second load lines, respectively; and
said high-pressure side of said accumulator circuit is connected at a connection located between said first and second proportional valves.

4. A hydrostatic drive according to claim 1, wherein
a permanent fluid volume supply is connected to said second displacement unit and is connected to said low-pressure side of said accumulator circuit between said first and second valves with non-return functions.

5. A hydrostatic drive according to claim 4, wherein
said permanent fluid supply is connected to a feed line at an inlet of said permanent fluid supply and is connected to a tank at an outlet of said permanent fluid supply, said feed line being permanently connected to said low-pressure side of said accumulator circuit via a connection point;
a non-return valve is disposed in said feed line between said connection point and said inlet; and
a pressure relief valve is disposed in said feed line between said connection point and said outlet.

6. A hydrostatic drive according to claim 1, wherein
said valve system further comprises:
a first proportional valve and a second proportional valve with proportional functions are connected to said first and second load lines respectively, said high pressure side of said accumulator circuit being connected at a connection located between said first and second proportional valves;
a first proportional relief valve is connected to and positioned in a section of said first load line that is between said first control valve and a connection point where said first proportional valve connects to said first load line; and
a second proportional relief valve is connected to and positioned in a section of said second load line that is between said second control valve and a connection point where said second proportional valve connects to said first load line, said first proportional relief valve being connected fluidly in parallel relative to said first proportional valve, said second proportional relief valve being connected fluidly in parallel relative to the second proportional valve.

7. A hydrostatic drive according to claim 6, wherein
said first and second proportional valves are located on a third connecting line; said first
and second proportional relief valves are located on a fourth connecting line; and
said third connecting line is connected to said fourth connecting line by a valve line containing a non-return valve.

8. A hydrostatic drive according to claim 1, wherein
said accumulator is a double piston accumulator having a double piston guided for longitudinal movement in an accumulator housing, having a first working chamber applied with a charging pressure, having a second working chamber on said high-pressure side of said accumulator circuit, having a third working chamber on said low-pressure side of said accumulator circuit, and having a fourth working chamber that is at atmospheric pressure, each of said working chambers being separated from one another by said double piston in the accumulator housing.

9. A hydrostatic drive according to claim 1, wherein
each of said first and second displacement units are four-quadrant systems that are operable as both a hydraulic motor and a hydraulic pump with an adjustable pivoting angle.

10. A valve device for a hydraulic drive, the valve device comprising:
a pair of first valves, each first valve located in respective first and second load lines, said first and second load lines are connectable to a fluid power displacement unit and a fluid outlet displacement unit, said pair of first valves being configured to selectively open and close their respective load lines;
a pair of second valves with non-return functions;
a pair of third valves with proportional functions;
a pair of fourth valves with proportional pressure relief functions;
said second valves, said third valves, and said fourth valves being connected to and positioned between said first and second load lines by connecting lines; and
an accumulator being disposed in an accumulator circuit, said accumulator circuit being subdivided into a low-pressure side and a high-pressure side, said pairs of first, second, third, and fourth valves being connected to said accumulator circuit; and
one of said pair of second valves is connected to and positioned between said first load line and said low-pressure side of the accumulator circuit, the other one of the said pair of second valves being connected to and positioned between said second load line and said low-pressure side of the accumulator circuit.

11. A valve device according to claim 10, wherein
a permanent fluid supply is connected to said connecting lines at a first connection point; and
a pressure relief valve is disposed in said accumulator circuit between the first connection point and a second connection point disposed in said connecting lines between said pair of third valves.

12. A hydrostatic drive, comprising:
a fluid power displacement unit having an adjustable volumetric flow and being coupled to a power supply;
a fluid output displacement unit having an adjustable volumetric flow and being coupled to an output drive, said power and output displacement units being connected to one another in a closed loop circuit by first and second load lines connected to respective input and output sides of said power and output displacement units;
an accumulator disposed in an accumulator circuit that is connected to said power and output displacement units, said accumulator circuit being subdivided into a low-pressure side and a high-pressure side;
a valve system being coupled to and controlling said power and output displacement units and said accumulator circuit, said valve system being connected to said first and second load lines and including first and second directional valves in said first and second load lines, respectively;
first and second non-return valves connected to one another and also connected to and disposed between said first and second load lines;
first and second proportional valves connected to one another, said first and second proportional valves being connected to and disposed between said first and second load lines, being in parallel to said first and second non-return valves, and being connected to said high-pressure side of said accumulator circuit at a connection between said first and second proportional valves; and first and second proportional relief valves being connected to one another, said first and second proportional relief valves being connected to said first and second load lines at locations between said first and second directional valves and said first and second proportional valves, and being fluidly in parallel to said first and second proportional valves.

13. A hydrostatic drive according to claim 12, wherein a permanent fluid volume supply is connected to said output displacement unit and is connected to said low pressure side of said accumulator circuit between said first and second non-return valves.

14. A hydrostatic drive according to claim 13, wherein said permanent fluid supply is connected to a feed line at an inlet of said permanent fluid supply and is connected to a tank at an outlet of said permanent fluid supply, said feed line being permanently connected to said low-pressure side of said accumulator circuit via a connection point;
a non-return valve is disposed in said feed line between said connection point and said inlet; and
a pressure relief valve is disposed in said feed line between said connection point and said outlet.

15. A hydrostatic drive according to claim 12, wherein said first and second proportional valves are located on a first connecting line; and
said first and second proportional relief valves are located on a second connecting line, said first connecting line being connected to the second connecting line by a valve line containing a non-return valve.

16. A hydrostatic drive according to claim 12, wherein said accumulator is a double piston accumulator having a double piston guided for longitudinal movement in an accumulator housing, having a first working chamber applied with a charging pressure, having a second working chamber on said high-pressure side of said accumulator circuit, having a third working chamber on said low-pressure side of said accumulator circuit, and having a fourth working chamber that is at atmospheric pressure, each of said working chambers separated from one another by said double piston in the accumulator housing.

17. A hydrostatic drive according to claim 12, wherein each of said power and output displacement units are four-quadrant systems that are operable as both a hydraulic motor and a hydraulic pump with an adjustable pivoting angle.

18. A hydrostatic drive comprising:
a first fluid displacement unit having an adjustable volumetric flow and being coupled to a power supply;
a second fluid displacement unit having an adjustable volumetric flow and being coupled to an output drive, said first displacement unit being connected to said second displacement unit in a closed loop circuit by first and second load lines connected to respective input and output sides of said first and second displacement units;
an accumulator disposed in an accumulator circuit being connected to said first and second displacement units, said accumulator circuit being subdivided into a low-pressure side and a high-pressure side;

a valve system configured to control said first and second displacement units and said accumulator circuit, said valve system being connected to said first and second load lines;
a first valve with a non-return function being connected to and positioned between said first load line and said low-pressure side of said accumulator circuit;
a second valve with a non-return function being connected to and positioned between said second load line and said low-pressure side of said accumulator circuit;
a permanent fluid volume supply being connected to said second displacement unit and being connected to said low-pressure side of said accumulator circuit between said first and second valves with non-return functions, said permanent fluid supply being connected to a feed line at an inlet of said permanent fluid supply and being connected to a tank at an outlet of said permanent fluid supply, said feed line being permanently connected to said low-pressure side of said accumulator circuit via a connection point;
a non-return valve being disposed in said feed line between said connection point and said inlet; and
a pressure relief valve being disposed in said feed line between said connection point and said outlet.

19. A hydrostatic drive according to claim 18, wherein said second displacement unit is connected to a low-pressure side of the hydrostatic drive; and
said first displacement unit is connected to a high-pressure side of the hydrostatic drive.

20. A hydrostatic drive according to claim 18, wherein a first proportional valve and a second proportional valve with proportional functions are connected to said first and second load lines respectively; and
said high-pressure side of said accumulator circuit is connected at a connection located between said first and second proportional valves.

21. A hydrostatic drive according to claim 18, wherein said valve system comprises:
a first control valve positioned in said first load line and a second control valve positioned in the second load line, said first and second control valves connecting said first and second displacement units to one another in two flow directions in their respective open positions thereof and connecting said first and second displacement units to one another in only one flow direction in their respective shut-off positions thereof;
a first proportional valve and a second proportional valve with proportional functions being connected to said first and second load lines, respectively, said high-pressure side of said accumulator circuit being connected at a connection located between said first and second proportional valves;
a first proportional relief valve being connected to and positioned in a section of said first load line that is between said first control valve and a connection point where said first proportional valve connects to said first load line; and
a second proportional relief valve being connected to and positioned in a section of said second load line that is between said second control valve and a connection point where said second proportional valve connects to said first load line, the first proportional relief valve being connected fluidly in parallel relative to said first proportional valve, said second proportional relief valve being connected fluidly in parallel relative to the second proportional valve.

22. A hydrostatic drive according to claim 21, wherein
said first and second proportional valves are located on a third connecting line; and
said first and second proportional relief valves are located on a fourth connecting line, said third connecting line being connected to said fourth connecting line by a valve line containing a non-return valve.

23. A hydrostatic drive according to claim 18, wherein
said accumulator is a double piston accumulator having a double piston guided for longitudinal movement in an accumulator housing, having a first working chamber applied with a charging pressure, having a second working chamber on said high-pressure side of said accumulator circuit, having a third working chamber is on said low-pressure side of said accumulator circuit and having a fourth working chamber that is at atmospheric pressure, each of said working chambers being separated from one another by said double piston in the accumulator housing.

24. A hydrostatic drive according to claim 18, wherein
each of said first and second displacement units are four-quadrant systems that are operable as both a hydraulic motor and a hydraulic pump with an adjustable pivoting angle.

25. A hydrostatic drive comprising:
a first fluid displacement unit having an adjustable volumetric flow and being coupled to a power supply;
a second fluid displacement unit having an adjustable volumetric flow and being coupled to an output drive, said first displacement unit being connected to said second displacement unit in a closed loop circuit by first and second load lines connected to respective input and output sides of said first and second displacement units;
an accumulator disposed in an accumulator circuit being connected to said first and second displacement units, said accumulator circuit being subdivided into a low-pressure side and a high-pressure side;
a valve system configured to control said first and second displacement units and said accumulator circuit, said valve system being connected to said first and second load lines;
a first valve with a non-return function being connected to and positioned between said first load line and said low-pressure side of said accumulator circuit;
a second valve with a non-return function being connected to and positioned between said second load line and said low-pressure side of said accumulator circuit; and
a first proportional valve and a second proportional valve with proportional functions being connected to said first and second load lines, respectively, said high-pressure side of said accumulator circuit being connected at a connection located between said first and second proportional valves.

* * * * *